(12) United States Patent
Khachatoorian

(10) Patent No.: US 6,276,071 B1
(45) Date of Patent: Aug. 21, 2001

(54) TAPE MEASURE WITH TAPE BRAKING CONTROL MECHANISM

(75) Inventor: Zareh Khachatoorian, Northridge, CA (US)

(73) Assignee: Olympia Group, Inc., City of Industry, CA (US)

( * ) Notice: Subject to any disclaimer, the term of this patent is extended or adjusted under 35 U.S.C. 154(b) by 0 days.

(21) Appl. No.: 09/374,525

(22) Filed: Aug. 14, 1999

(51) Int. Cl.[7] .............................. G01B 3/10; B65H 75/30
(52) U.S. Cl. ................... 33/767; 242/381.3; 242/381.6; 33/761
(58) Field of Search ............................ 33/755, 760, 767, 33/761, 769; 242/381.3, 381.6

(56) References Cited

U.S. PATENT DOCUMENTS

| | | | |
|---|---|---|---|
| 4,194,703 | * | 3/1980 | Roe ..................................... 242/381.3 |
| 4,903,912 | * | 2/1990 | Coughlin .......................... 242/381.1 |
| 4,976,048 | * | 12/1990 | Blackman .............................. 33/767 |
| 5,001,843 | * | 3/1991 | Chapin ............................. 242/381.3 |
| 5,007,178 | * | 4/1991 | Dewire et al. ......................... 33/767 |
| 5,379,523 | * | 1/1995 | Wingert ................................. 33/767 |
| 5,395,069 | * | 3/1995 | Chen ................................ 242/381.3 |
| 5,531,395 | * | 7/1996 | Hsu ................................... 242/381.6 |
| 5,794,357 | * | 8/1998 | Gilliam et al. ......................... 33/767 |
| 5,829,154 | * | 11/1998 | Lin ........................................ 33/767 |
| 6,032,380 | * | 3/2000 | Li ......................................... 33/767 |
| 6,032,896 | * | 3/2000 | Liu .................................... 242/381.6 |

* cited by examiner

Primary Examiner—Diego Gutierrez
Assistant Examiner—R. Alexander Smith
(74) Attorney, Agent, or Firm—Lackenbach Siegel Marzullo Aronson & Greenspan

(57) ABSTRACT

A spring-loaded tape cartridge in a tape measure housing includes a coilable tape rotatably mounted to position a free end of the tape to pass through an opening in the housing. The tape cartridge is biased to retract the tape into the compartment when the free end is pulled out of the housing to perform a measurement. A stop tab at the free end engages the workpiece and assures that the free end remains outside housing and available for gripping. An internal spring portion acts between the housing and the tape cartridge for applying a substantially constant frictional force on the tape cartridge. A second spring portion is provided for selectively applying increased and decreased frictional forces on the tape cartridge to supplement the substantially constant frictional forces. A locking member is provided for selectively applying a substantially normal pressure to the tape transverse to the movement path to positively lock the tape against the housing and prevent the tape from moving relative to the housing. A finger-actuated control or rocking button actuates the second friction-producing spring to decrease frictional forces in the releasing position, maintaining the locking member disengaged from the tape, urging the locking member into contact with the tape and actuating the second friction-producing spring portion to increase the frictional forces in the locking position, and to apply intermediate frictional forces on the cartridge while maintaining the locking member disengaged from the tape in the neutral position of the control or rocking button.

10 Claims, 4 Drawing Sheets

TAPE MEASURE WITH TAPE BRAKING CONTROL MECHANISM

BACKGROUND OF THE INVENTION

1. Field of the Invention

The present invention generally relates to tape measures and, more specifically, to a tape measure with an improved tape braking control mechanism.

2. Description of the Prior Art

Tape measures of the type that has a spring loaded tape cartridge including a coilable tape have been widely accepted in the marketplace for a variety of consumer and professional uses. Such spring loaded tape allows the tape to be withdrawn or pulled outside of the housing of the tape measure, a power spring employed in connection with the tape cartridge providing a retracting force tending to draw the metal tape rule back into the case and rewind it or re-coil it about the spool or bobbin from which it was withdrawn. However, depending on the size of the tape, the extent to which the tape was withdrawn and the strength of the spring, a tape can be retracted with such force and velocity that the tape can cause injury to a user or others standing by and also can cause damage to the tape itself. With such tape measures, when the tape is inadvertently released and there is no longer any tension to counteract the retraction force of the spring, the tape initially starts to recoil quite vigorously. However, unless the user quickly grips the tape and gains control over it, the tape will tend to accelerate and gradually even increase its speed. The danger of attempting to grasp the moving tape is that the relatively sharp edges of the tape can cause cuts unless the hand of the user is protected, such as by a glove. Also, because long lengths of metal tape frequently do not have the ability to remain straight but bend along different portions thereof, a rapid retraction of the tape can also cause damage to the tape by kinking the same and, in some instances when the tape is violently retracted, the tape can actually fracture or become severed. During such instances when the tape is retracted at a very high speed, there is always the danger that the free end of the tape will be randomly propelled in space and may also injure a user or bystander by the random and violent movements of the tape. Repeated retractions of this type may also reduce the service life of the tape measure.

Means have been used in known tape measures for locking and/or slowing down retracting tapes. Typically, this involves applying pressure to a locking button exteriorly mounted on the housing. The locking button is normally mounted for movements over a limited range between tape releasing and tape locking positions. In such instances, the manually actuated button is coupled or linked to a mechanism in the housing for slowing the retracting tape or holding it in place, the movement of the button to the locking position causing a member within the housing to come into contact with the tape. However, such arrangement is not always satisfactory and can be inefficient. Additionally, the application of an internal member into pressure abutment against the face of a tape can also cause such surface to become scored and, in time, remove enough of the markings or measurement indicia to render the tape measure less useful.

In order to address some of the aforementioned problems, a tape measure is disclosed in U.S. Pat. No. 5,531,395 for a stopping device for tape measures. The tape measure is provided with a tape roller equipped with an inner helical spring and an outer tape measure. A plurality of mounting pieces are provided on the internal surfaces of the housing for supporting a stopping spring. The stopping spring is released from the outer stopping rim of the roller, allowing the tape to be automatically retracted using the tension of the helical spring of the tape roller. Release of the locking button allows the tension of the helical spring to return to its initial position, pressing against the outer stopping rim on one side of the tape roller and thus providing the means for stopping the tape roller. In the disclosed arrangement, however, it is clear that the stopping action is achieved by wedging a free end of a locking button extension between a mounting piece and a mounting rod, the extension being somewhat deformed and wedged to provide some measure of friction between the contacting elements. Because of the manner of construction, the button extension may find it difficult to remain in the locked position, particularly against the action of the spring which tends to return the button to its normal, releasing position. Also, inadvertent pressure on the button, which would tend to relax the same, could also inadvertently release the button.

SUMMARY OF THE INVENTION

Accordingly, it is an object of the present invention to provide a tape measure that does not have the disadvantages inherent in comparable known tape measures.

It is another object of the present invention to provide a tape measure that is simple in construction and economical to manufacture.

It is still object of the invention to provide a tape measure as in the previous objects in which the tape can be controlled more effectively and the speed of the returning tape can be reduced.

It is yet another object of the invention provide a tape measure of the type under discussion which promotes safety to the user and others standing by.

It is a further object of the invention to provide a tape measure as in the previous objects which reduces the risk of bending or kinking of the tape and, therefore, increases the service life of the tape measure.

It is still a further object of the present invention to provide a tape measure as in the previous objects which substantially eliminate the risk of accidental or inadvertent release of the tape, by positively locking the tape when so desired.

It is yet a further object of the invention to provide a tape measure that utilizes a conveniently positioned rocking or control button that is pivotally mounted on the housing and provides a positive tactile feedback when the tape is positively locked and also when the tape is released.

It is yet an additional object of the invention to provide a tape measure in which the lock button is conveniently positioned on the front part of the top wall of the case of an ergonomic housing design for most comfortable operation.

In order to achieve the above objects, as well as others which become apparent hereafter, a tape measure in accordance with the present invention comprises a substantially closed rectangular housing formed of two mating hollow housing portions normally joined along a parting line defining a parting plane to form an internal compartment and top, bottom, front, rear and a pair of opposing side walls. Said housing has an opening in the form of a slot normal to the parting plane generally in the region where said front and bottom walls join. A spring loaded tape cartridge includes a coilable tape provided with measurement indicia and rotatably mounted within said compartment to position a free end of said tape for passage through said opening along a movement, path or direction substantially parallel to said bottom wall. Said tape cartridge is biased to retract said tape into said compartment when said free end is pulled externally of said housing to extend said tape to perform a measurement. Stop means is provided at said free end to engage a workpiece to assure that said free end remains exterior to said housing and available for gripping by a user. First friction producing means is provided acting between said housing and said tape cartridge for normally applying a substantially constant frictional force on said tape cartridge to normally maintain said tape in any desired extracted or extended position. Second friction producing means is provided for selectively applying increased and decreased frictional forces on said tape cartridge to supplement said substantially constant frictional forces. Locking means is providing for selectively applying a substantially normal pressure to said tape transverse to said movement path to positively lock said tape against said housing and to prevent said tape from moving. Finger actuated control means is provided and engageable with said second friction producing means and selectively positionable between a locking position, a releasing position and a neutral position. Said control means actuates said second friction producing means for decreasing said frictional forces in said releasing position while maintaining said locking means out of engagement with said tape. Said control means urges said locking means into contact with said tape and for actuating said second friction producing means for increasing said frictional forces in said locking position. Said control means also actuates said second friction producing means for applying intermediate frictional forces on said cartridge while maintaining said locking means out of engagement with said tape in said neutral position of said control means.

BRIEF DESCRIPTION OF THE DRAWINGS

The aforementioned and other features of the present invention will become more apparent from the following discussion and the accompanying drawings, wherein.

DETAILED DESCRIPTION OF THE PREFERRED EMBODIMENT

Figure 1:
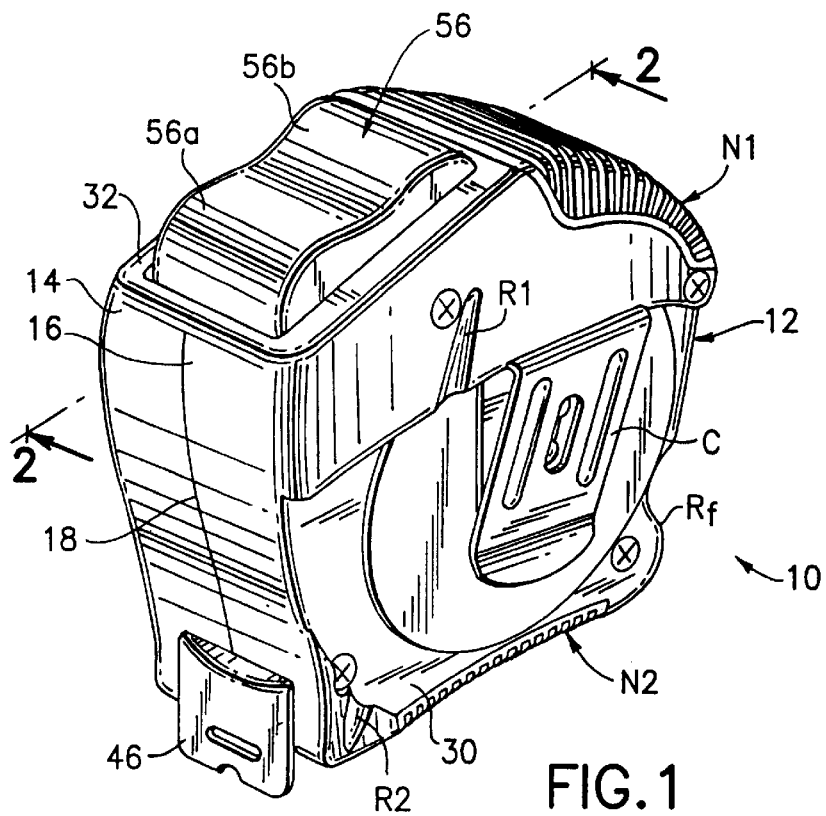
FIG. 1 is a perspective view of a tape measure with improved tape braking control mechanism in accordance with the present invention.

Referring now specifically to the drawings, in which identical or similar parts are designated by the same reference numerals throughout, and first referring to FIG. 1, a tape measure incorporating an improved tape braking control mechanism in accordance with the present invention is generally designated by the reference numeral 10.

Figure 4:
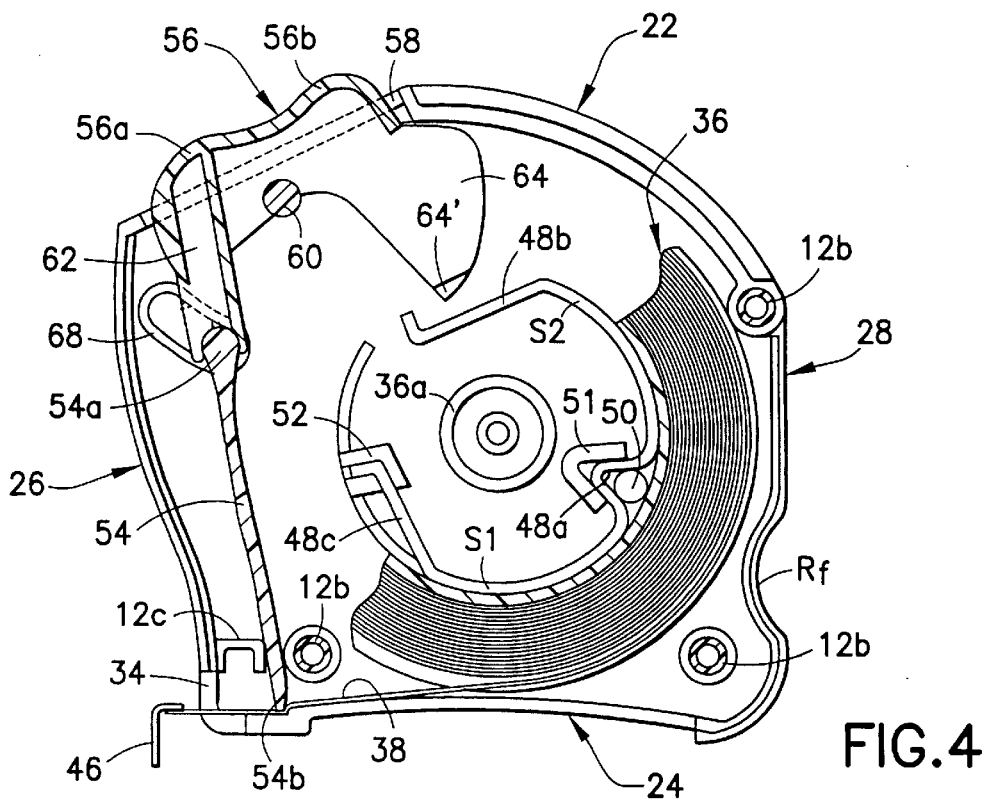
FIG. 4 is similar to FIGS. 2 and 3, but showing the control or rocking button in a locking position in which maximum friction is applied to the tape cartridge, being significantly greater than that required to overcome the cartridge internal spring force, thereby avoiding rotation when the tape is released, and also showing a locking member, forming part of a toggle mechanism with the control or rocking button moved beyond a dead center point to positively lock the tape by applying physical pressure on one side of the tape against the housing.
Figure 5:
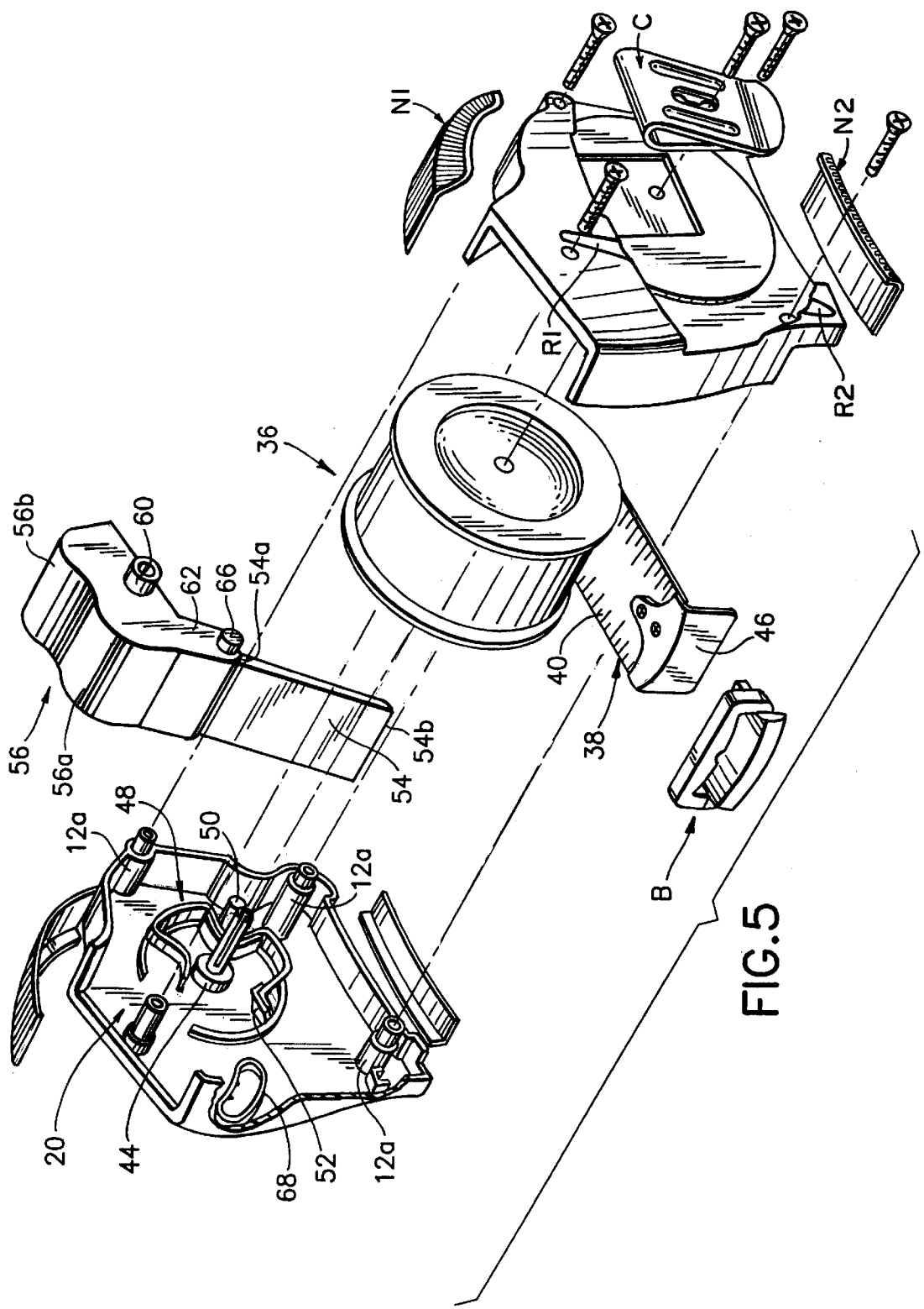
FIG. 5 is an exploded view of the tape measure shown in FIG. 1 illustrating the component parts and the manner in which they are assembled.

A tape measure 10 includes a substantially closed rectangular housing 12 formed of two mating hollow housing portions 14, 16 that are normally joined along a parting line 18, defining a parting plane extending therethrough, to form an internal compartment 20 (FIG. 5). The housing 12 defines a top wall 22, a bottom wall 24, a front wall 26, a rear wall 28 and two opposing side walls 30, 32. The housing 12 has an opening 34 (FIGS. 2–4) in the form of a slot normal to the parting plane generally in the region where the front and bottom walls 26, 24, respectively, join.

Figure 2:
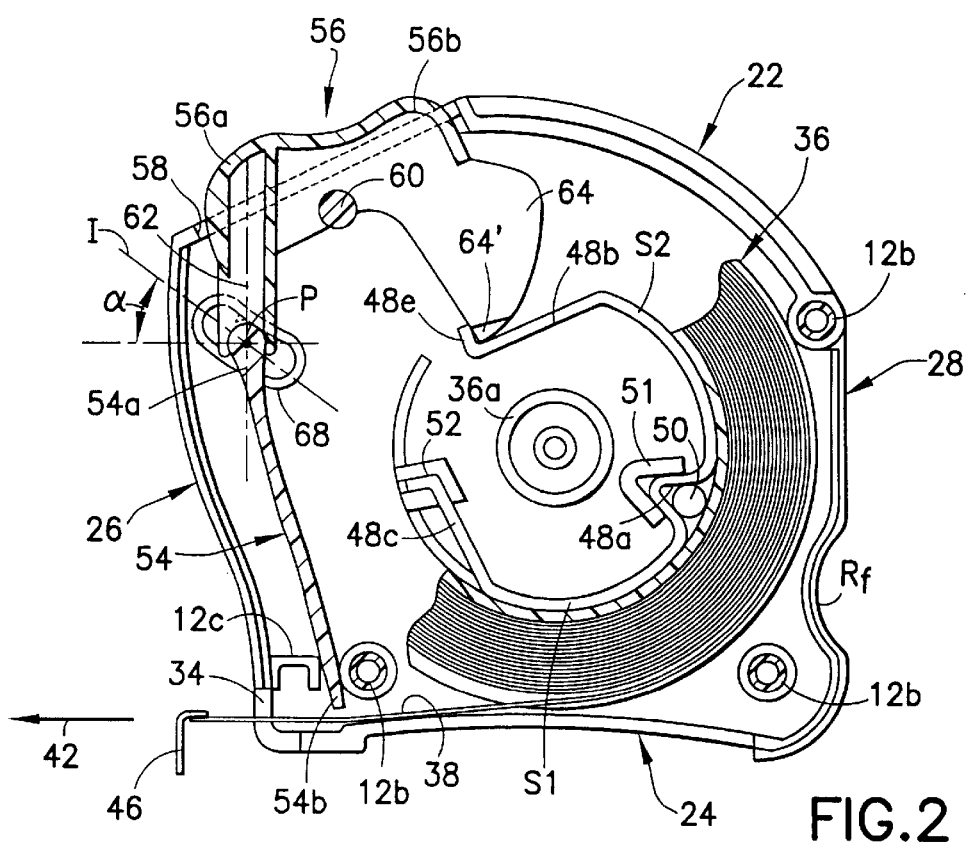
FIG. 2 is a cross sectional view of the tape measure shown in FIG. 1, taking along line 2—2, showing the rocking or control button in a neutral position which results in sufficient frictional force being applied to the tape cartridge to prevent it from being re-coiled into the housing, independently of the position of tape.
Figure 3:
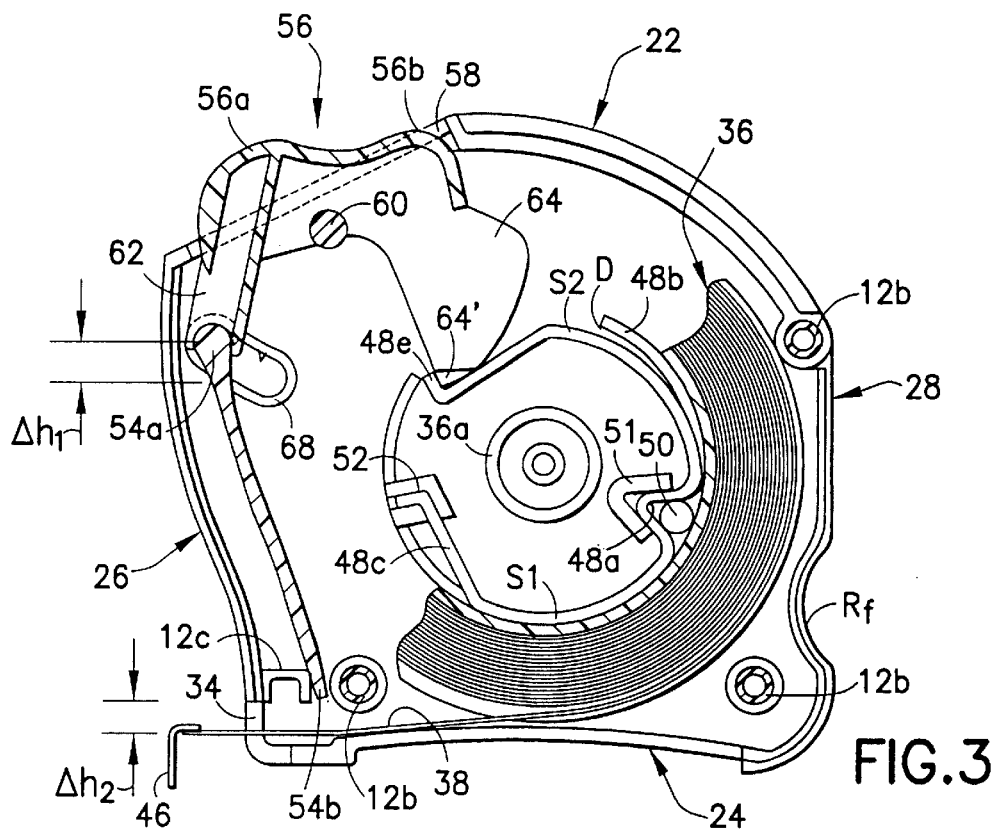
FIG. 3 is similar to FIG. 2, but showing the rocking or control button in a release condition in which friction is removed from the cartridge to a point below the level necessary to be overcome by the force of the internal springs to the tape cartridge so that release of the tape will cause same to be retracted within the housing, although at a lower or attenuated rate.

A conventional springloaded tape cartridge 36 is mounted within the housing 12, the cartridge including a coilable metal tape 38 provided with measurement indicia 40 (FIGS. 5 and 6) and rotatably mounted within the internal compartment 20. Towards that end, suitable bosses or protuberances may be formed on the internal surfaces of the side walls 30, 32, as will be more fully described, for ensuring that the cartridge 36 remains centered within the housing and can rotate without incurring excessive or sporadic frictional forces. When so mounted, as shown in FIGS. 2–4, the free end of the tape 38 is positioned in line with the opening 34 for passage therethrough and for movement along a path or direction 42 which is substantially parallel to the bottom wall 24. The tape cartridge 36 is biased in a conventional way to normally retract the tape into the compartment 20 when the free end is pulled externally or exteriorly of the housing to extend the tape to perform a measurement. As with conventional measuring tapes, the tape 38 is drawn out along a direction 42 substantially parallel to the bottom wall 24 to perform a measurement. Also, as with conventional tape measures, the tape or blade 38 is provided at the free end thereof with a L-shaped transverse hook or stop tab 46 to engage a workpiece and to ensure that the free end remains positioned outside of the housing 12 and always available for gripping by a user.

Figure 6:
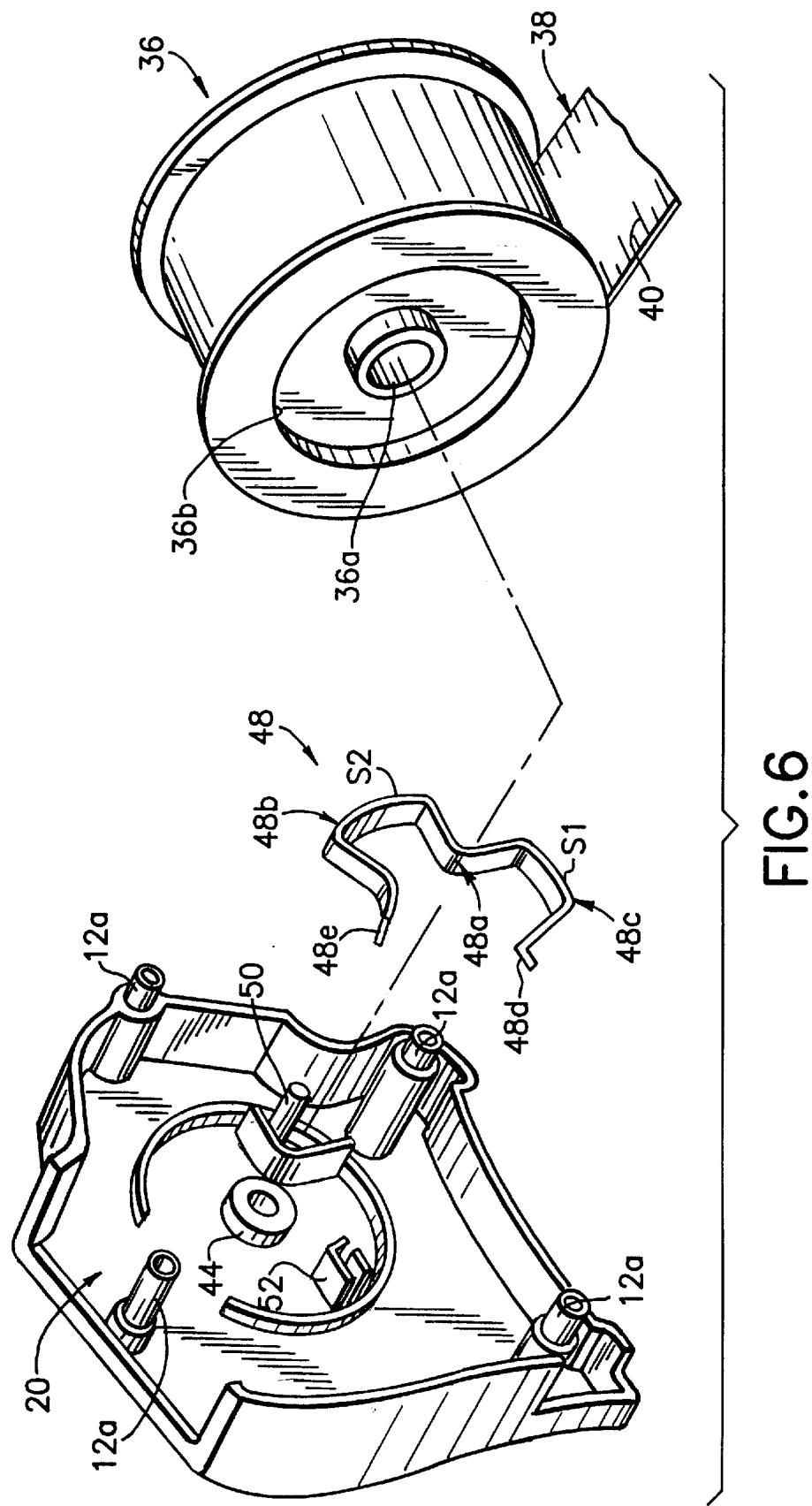
FIG. 6 is a partial exploded view, similar to FIG. 5, but showing the details of the friction bearing spring and the manner in which it is assembled in contact with the cartridge and associated wall of the tape measure housing.

Referring to FIG. 6, an irregularly shaped spring 48 is provided that has a general configuration or is in the shape of the numeral "3", and is substantially symmetrical about the mid portion 48a which is generally V-shaped as shown. Extending from one leg of the portion 48a is a generally L-shaped spring portion 48b and like L-shaped spring portion 48c. The portion 48c includes an arcuate portion S1 and a generally right angle tab or lip 48d, and spring portion 48b includes an arcuate portion S2 and a generally right angle tab or lip 48e as shown. The two arcuate lengths S1, S2 of the spring portions 48b, 48c generally form arcs of a circle the diameter of which substantially corresponds to the outer diameter of a recess 36b provided in the side of the cartridge 36 as shown, for example, in FIG. 6. The cartridge 36 includes a hub 36a which is rotatably mounted on the circular post or boss 44 on the side wall as also shown in FIG. 6. In assembly, the V-shaped portion 48a is centered between a post 50 and a V-shaped boss 51, both protruding from the internal surface of the side wall 32, this being shown in FIGS. 2–4. The post 50 generally centers the spring in the desired orientation and positions the tab 48d to be inserted or received within spring and retaining bosses 52. The tab or lip 48e remains free for reasons to be described. The dimensions of the spring and the dimension of the internal diameter of recess 36b are selected such that the spring portion 48c, when the unit is assembled, positions the arcuate portion S1 of that spring portion in abutment against the inner surface 36b of the spool to apply a frictional force therebetween during relative rotation of the cartridge 36 about the hub 36a by selecting the arcuate length of S1 (FIG. 2) and the degree to which such arcuate portion is press fitted or forced against the arcuate surface of the cartridge, these components will provide a first friction producing system which acts between the housing 12 and tape cartridge 36 for normally applying substantially constant frictional force on the tape cartridge. Therefore, the friction force provided by the arcuate length S1 of the spring portion 48c should always be less than the spring force applied on the cartridge to retract the tape in a customary manner, the friction supplied by the fixed portion 48c is sufficient to reduce the effect of the cartridge's internal spring and to, therefore, attenuate or moderate the force acting on the tape cartridge. This will reduce the acceleration on the tape when released and also reduce the velocity or speed of retraction.

In order to provide added control, the second spring portion 48b is mounted to allow that spring portion to either be spaced from the arcuate surface 36b, be in slight contact or be urged against that surface with a more significant force. This will, clearly, correspondingly decrease or increase the frictional forces applied to the cartridge, as to be described.

A suitable locking element is provided, best shown in FIGS. 2–5, which is generally designated by the reference numeral 54. The element 54 is mounted for selectively applying a substantially normal pressure to the tape 38 transverse to the movement path or direction 42 to positively lock the tape against the housing 12 and to prevent the tape from moving relative thereto substantially independently of the forces or conditions of the various springs that are employed within the housing.

Control of the locking element 54 is achieved with a finger actuated control lever or rocking button 56 that is preferably provided with two spaced elevated front and rear portions, 56a and 56b, separated by an indentation or depressed or recessed region, as shown. The bosses 60 are dimensioned and arranged to receive one of the bosses 12a formed on the interior surface of the side wall 32 so that the button 56 can rock or pivot about the boss. The button 56, as is to be more specifically described below, is engageable with the tab or lip 48e of the movable spring portion 48b and is selectively positionable between a locking position, shown in FIG. 4, a neutral position, shown in FIG. 2, and a releasing position, shown in FIG. 3. The control element or pivoted or rocking button 56 can thereby actuate the spring portion 48b to adjust the degree of friction that needs to be imparted or needs to be removed from the cartridge 36. It should be clear that any additional friction imparted by the spring portion 48b which increases the total amount of friction, when added to the fixed friction imparted by the spring portion 48c, that exceeds the internal spring force supplied within the cartridge 36 to retract the tape 38, will be sufficient to overcome such internal spring and the tape will remain extended to any position to which it is drawn out since the friction applied to the cartridge will, in that event, be sufficient to overcome any other spring actions that tend to pull the spring in. If the fixed friction applied by the spring portion 48c is only somewhat less than the force applied by the internal cartridge spring, it will be evident that the spring portion 48b will need to apply very little by way of additional friction in order to render the cartridge stationary or immobile when the button 56 is in its neutral position, as shown in FIG. 2, and the spring portion 48b applies only a light frictional load on the bobbin or spool of the cartridge. Of course, as indicated, when the button 56 is rocked or pivoted to the release position shown in FIG. 3, the spring portion 48b moves away or separates from the arcuate surface 36b to create a clearance D, relieving or removing all or most of the friction normally applied by the spring portion 48b. Under those conditions, the total friction applied to the bobbin or cartridge again drops below the amount required to overcome the internal cartridge spring and the cartridge spring again becomes effective to draw in the tape even if this is at a moderated or attenuated speed.

Control over the movable spring end portion 48b is provided by a depending engaging finger 64 that extends into the housing, as best shown in FIGS. 2–4, and having a remote or free end or tip 64' which is configured to engage the lip or tab 48e in selected positions of the rocking button 56. Thus, in the released position shown in FIG. 3, the finger tip 64' rotates the spring portion 48b in a generally counterclockwise direction, as viewed in FIG. 3, to provide the aforementioned clearance and removal of frictional forces imparted by that element. When the rocking button 56 is moved to the neutral position shown in FIG. 2, contact remains between the lip or tab 48e and the finger 64. However, the configuration of both the finger 64 and the spring portion 48b are so selected that in the neutral position the finger 64 maintains the arcuate length of the spring portion 48b in slight or partial contact with the arcuate surface 36b to provide an intermediate level of additional friction on top of the friction provided by the fixed spring portion 48c. It is only when the rocking button 56 is moved to the locking position shown in FIG. 4 that there is a separation between the finger tip 64' and tab or lip 48e so that the maximum length of the arcuate section of the spring portion 48b makes contact and the maximum desired additional friction is imparted.

While the friction imparted by the spring portion 48b, in the locked position of FIG. 4, is typically more than adequate to prevent the cartridge 36 from rotating, since the total frictional forces acting on the cartridge are now significantly greater than the retracting spring forces applied by the springs internal to the cartridge, an important feature of the present invention is the provision of the locking member or element 54 in the form of a generally elongate tongue which forms, with the rocking button 56, a toggle system. While a specific toggle arrangement will be described in connection with FIGS. 2–4, it will be clear to those skilled in the art that other toggle arrangements may be used in order to achieve the same or similar purposes or functions to be described.

The rocking button 56, mounted for pivoted rotation about the boss 60, includes an engaging portion or member 62 which extends from the button interiorly into the housing as shown. The engaging member 62 has a lower free end which is movable between first and second positions along a predetermined path generally designated by the line I (FIG. 2), when the rocking button moves between the locking, neutral and releasing positions. The locking member or tongue 54 includes an elongate, somewhat flexible member having a first end 54a pivotably connected at a pivoting point P as shown, for example, in FIG. 2, to the lower free end of the engaging portion or member 62 to share the movements of such lower free end over the predetermined path. The tongue or locking member 54 also has a second end 54b in close proximity of the tape 38 along the bottom wall 24 in the releasing position. The predetermined path I is oriented at an angle α to the bottom wall, as indicated by the line I in FIG. 2, to lift the locking member above the tape 38 in the releasing position and urging the locking member against the tape to cause at least some flexure of the tongue only in the locking position thereof. The pivot point P passes a dead center point along the predetermined path I which causes the tongue or locking member to snap to one side or the other side of the dead center point, depending on the direction of movement. As shown in FIG. 4, when the pivot point P moves to the right of the dead center point, as viewed in FIG. 4, this causes the locking member to be positively locked against the tape when the control button is moved to the locking position as shown.

In order to control the positions and movements of the pivot point P, there is advantageously provided a generally oval boss or raceway 68 which defines the predetermined path that lies along the inclined direction I. The oval boss 68 is provided at least on one internal surface of the housing portions, although, in the preferred embodiment, mirror images of these bosses are provided on both internal surfaces of both side walls to provide better support to the locking member 54. Towards this end, the first or upper end 54a of the locking member 54 is preferably provided with laterally projecting pin portions 66 (FIG. 5) that are dimensioned to be received within the oval bosses 68 so that they can move from one end to the other but cannot move out of the area defined by the oval boss 68, as the lateral pins are captured therein.

As will be clear from FIGS. 2–4, the arrangement shown functions as a toggle system, the engaging member 62 applying a force directed to one side of the locking member 54 in the releasing and neutral positions of the rocking or control button 56, while the lower free end 62 applies a force directed to the other side of the locking member 54 after flexing same when placed into abutment against the tape in the locking position of the control or rocking button following passage of the pivoting point P through the dead center point.

Advantageously, the predetermined path I defined by the oval raceway 68 has two end points that are spaced from each other a distance along a direction substantially parallel to the front wall 26 substantially corresponding to the range of distances assumed by the second or lower end 54b of the locking member 54 between the locking and releasing positions of the rocking or control button. This is represented in FIG. 3 by the distances $\Delta h_1$ and $\Delta h_2$ which are substantially equal to each other.

Although the path or raceway formed by the boss 68 appears to be linear it is, in fact, slightly arcuate as the engaging member 62 is fixedly mounted on the control or rocking button 56 which is itself pivotally mounted for rotation about the boss 60. The locking member 54 is preferably formed of a stiff, generally bendable material so that the member need not be made with exacting tolerances. By making this member somewhat flexible, any variations in tolerances will be compensated by bending or flexing of the member itself.

The bosses 12a serve, in some cases, dual functions. Thus, while such bosses are primarily used as spacers for aligning and positioning the two hollow mating portions 14, 16, the lower boss 12a in the region of the opening 34 also cooperates with an additional spacer or boss 12c to define a space therebetween to serve as a guide for the locking member 54. As will be evident from FIGS. 2–4, the lower end of the locking member 54 always remains between the bosses 12a and 12c. The locking member 54 simply moves upwardly and downwardly in relation to the rocking motions of the control or rocking button 56, in accordance with the toggle feature described above. Thus, the control or rocking button 56 serves two separate and distinct functions in the described unit. First, the button 56 controls the level or degree of friction applied to the cartridge 36 by controlling whether the movable spring portion 48b makes contact with the cartridge 36 and also the extent to which such contact is made and, therefore, the extent to which friction is applied to such cartridge. However, in the locking position the locking button 56 also forces the toggle mechanism to which it is joined to snap and provide a positive locking engagement of the locking member 54 against the tape. In the condition shown in FIG. 4, therefore, not only is the friction applied to the tape substantially greater than the friction needed to overcome the retractive forces of the cartridge spring but with the positive lock pressure applied on the tape by the locking member 54, the frictional forces tending to maintain the tape in the selected position are so high that it becomes extremely difficult, if not virtually impossible, to further pull the tape out or cause any of the tape to retract back into the housing. Being a toggle arrangement, a fair amount of force needs to be applied to the control or rocking button 56 to reverse the toggle action and release the locking member from the tape. This avoids inadvertent and accidental movements that might undesirably release the tape. As should be clear, therefore, the tape measure in accordance with the present invention provides an improved and reliable tape braking control system.

Other aspects of the tape measure include the use of a curved transverse recess $R_f$ in the rear wall 28 which is suitable for positioning of a finger, normally the pinkie, to facilitate the holding of the tape measure. Depressions $R_1$ and $R_2$ may be used as guides for a pencil or marking device, as more fully disclosed in U.S. patent application Ser. No. 09/272,121 assigned to the same assignee as the present application. A clip C is typically provided on such tape measures. Suitable fasteners, such as screws, are typically used to connect the two mating hollow shell members 14, 16 together as well as to attach the clip C to the housing. To enhance the comfort and minimize slipping of the tool while in use, the top wall 22 of the housing is preferably provided with an upper elastomeric slip resistant material, such as a rubberized member $N_1$. A comparable lower elastomeric slip resistant member $N_2$ is provided along the major portion of the bottom wall 24. The upper member $N_1$ preferably extends from the opening 58 through which the rocking or control button 56 extends to the beginning of the rear wall 28, thereby covering the entire arcuate portion of the top wall 22 and ending where the generally straight or flat vertical rear wall 28 ends. Preferably, the members $N_1$ and $N_2$ extend somewhat beyond the top and bottom walls, to each side thereof, so as to also cover a small region along the covered walls on the adjacent side walls 30, 32. The two gripping members $N_1$ and $N_2$ will cover those portions of the tape measure typically in contact with the hand of the user, with the exception of the rocking or control button 56. Such members $N_1$, $N_2$ can be applied to the housing in any known or conventional way, one method being the use of adhesive to attach the slip resistant gripping portions to conforming surfaces (FIG. 3). Another method is to use a double injection molding to mold the members $N_1$, $N_2$ in place. It is also possible to provide, at the tape exit area or at the opening 34, a shock absorbing cushion bumper B (FIG. 5) which generally matches the shape of the same curvature as the blade top surface. An internally positioned rubberized flap at the blade exit opening 34 will tend to prevent unwanted debris from entering inside the case. The flap does not make contact with the upper surface of the tape, thus not causing any abrasive pressure to the markings thereon.

The invention has been shown and described by way of a presently preferred embodiment, and many variations and modifications may be made therein without departing from the spirit of the invention. The invention, therefore, is not to be limited to any specified form or embodiment, except insofar as such limitations are expressly set forth in the claims.

What I claim:

1. Tape measure comprising a substantially closed housing formed of at least two mating hollow housing portions normally joined along a parting line defining a parting plane to form an internal compartment and top, bottom, front, rear and a pair of opposing side walls, said housing having an opening in the form of a slot normal to the parting plane generally in the region where said front and bottom walls join; a spring loaded tape cartridge including a coilable tape provided with measurement indicia and rotatably mounted within said compartment to position a free end of said tape for passage through said opening along a movement path or direction and substantially parallel to said bottom wall, said tape cartridge being biased to retract said tape into said compartment when said free end is pulled externally of said housing to extend said tape to perform a measurement;

stop means at said free end to engage a workpiece and to assure that said free end remains exterior to said housing and available for gripping by a user; first friction producing means acting between said housing and said tape cartridge for normally applying a substantially constant frictional force on said tape cartridge to normally maintain said tape in any desired extracted or extended position; second friction producing means for selectively applying increased, intermediate and decreased frictional forces on said tape cartridge to supplement said substantially constant frictional forces; locking means for selectively applying a substantially normal pressure to said tape transverse to said movement path to positively lock said tape against said housing and to prevent said tape from moving; finger actuated control means selectively engageable with said second friction producing means and positionable between a locking position, releasing position and neutral position, said control means actuating said second friction producing means for decreasing said frictional forces in said releasing position while maintaining said locking means out of engagement with said tape, said control means urging said locking means into contact with said tape and actuating said second friction producing means for increasing said frictional forces in said locking position, and said control means actuating said second friction producing means for applying intermediate frictional forces on said cartridge while maintaining said locking means out of engagement with said tape in said neutral position of said control means.

2. A tape measure as defined in claim 1, wherein said locking means comprises a toggle element.

3. A tape measure as defined in claim 2, wherein said toggle element includes an engaging portion extending from said control means interiorly into said housing and having a lower free end thereof movable between first and second positions along a predetermined path with movements of said control means between said locking, neutral and releasing positions, said locking means comprising an elongate somewhat flexible tongue having a first end pivotably connected at a pivoting point to said lower free end of said engaging portion to share the movements of said lower free end over said predetermined path and having a second end in close proximity of said tape along said bottom wall in said releasing position, said predetermined path being oriented at an angle to said bottom wall to lift said tongue above said tape in said releasing position and urging said tongue against said tape to cause at least some flexure of said tongue only in said locking position, said pivoting point passing a dead center point along said predetermined path which causes said tongue to be positively locked against said tape when said control means is moved to said locking position.

4. A tape measure as defined in claim 3, wherein said predetermined path is defined by a generally oval boss formed on at least one internal surface of said housing portions, said first end of said tongue having laterally projecting pin portions that are dimensioned to be received and follow within said oval boss.

5. A tape measure as defined in claim 3, wherein said lower free end is oriented to apply a force directed to one side of said tongue in said releasing and neutral positions of said control means, while said lower free end applies a force directed to the other side of said tongue after flexing the same when placed into abutment against said tape in said locking position of said control means following passage of said pivoting point through said dead center point.

6. A tape measure as defined in claim 3, wherein said predetermined path has end points that are spaced from each other a distance along a direction substantially parallel to said front wall substantially corresponding to a range of distances assumed by said second end between said locking and releasing positions.

7. A tape measure as defined in claim 1, wherein said control means comprises a rocking button pivotally mounted on said housing, said lower free end moving along an arc of a circle in moving over said predetermined path.

8. A tape measure as defined in claim 7, wherein said rocking button has a depending finger that extends into said housing and into proximity to said second friction producing means and arranged to engage said second friction producing means in said neutral and release positions of said control means and to clear said second friction control means in said locking position.

9. A tape measure as defined in claim 8, wherein said second friction producting means includes a spring portion frictionally engageable with said tape cartridge, said spring portion being provided with a detent at a free end thereof which is arranged to engage said depending finger.

10. A tape measure as defined in claim 1, wherein said locking means is formed of a stiff but generally bendable material.

* * * * *